US012663600B2

(12) United States Patent
Sauvain

(10) Patent No.: US 12,663,600 B2
(45) Date of Patent: Jun. 23, 2026

(54) SEAL ASSEMBLY FOR A PORT OF AN ENCLOSURE THAT PERMITS A CABLE TERMINATED WITH A CONNECTOR TO BE INSERTED INTO AND REMOVED FROM THE PORT WITH THE CONNECTOR ATTACHED TO THE CABLE

(71) Applicant: PPC BROADBAND, INC., East Syracuse, NY (US)

(72) Inventor: Henry Sauvain, East Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 324 days.

(21) Appl. No.: 18/375,938

(22) Filed: Oct. 2, 2023

(65) Prior Publication Data

US 2024/0111110 A1 Apr. 4, 2024

Related U.S. Application Data

(60) Provisional application No. 63/412,511, filed on Oct. 2, 2022.

(51) Int. Cl.
*G02B 6/00* (2006.01)
*G02B 6/44* (2006.01)

(52) U.S. Cl.
CPC ................................ *G02B 6/44465* (2023.05)

(58) Field of Classification Search
CPC .... G02B 6/44465; G02B 6/00; H02G 15/113; H02G 3/088
See application file for complete search history.

(56) References Cited

U.S. PATENT DOCUMENTS

| | | | | |
|---|---|---|---|---|
| 7,302,152 | B2 * | 11/2007 | Luther | ............... G02B 6/44465 |
| | | | | 385/100 |
| 9,106,981 | B2 * | 8/2015 | Vastmans | ............. H02G 15/076 |
| 11,300,745 | B2 * | 4/2022 | Aznag | .................. G02B 6/4444 |

FOREIGN PATENT DOCUMENTS

| | | |
|---|---|---|
| CA | 2169926 A1 | 3/1995 |
| WO | 2014035611 A1 | 3/2014 |

OTHER PUBLICATIONS

International Search Report and Written Opinion dated Feb. 5, 2024 in corresponding International Application No. PCT/US2023/034322, 12 pages.

* cited by examiner

*Primary Examiner* — Jennifer Doan
(74) *Attorney, Agent, or Firm* — MH2 TECHNOLOGY LAW GROUP LLP

(57) ABSTRACT

A seal assembly for a port of an enclosure may include a first body portion, a sealing member, and a second body portion that may have an engagement portion. The sealing member may include a receiving portion that may receive a terminated cable, and the engagement portion may urge a closing portion of the sealing member against the terminated cable to form a liquid-tight seal around the terminated cable when the first portion and the second portion are coupled together in a closed position. The first and second body portions may move relative to one another between an open position and the closed position such that the seal arrangement permits a cable terminated with a connector to be inserted into and/or removed from the sealing member and the port with the connector attached to the cable when the first and second body structure segments are in the open position.

20 Claims, 5 Drawing Sheets

SEAL ASSEMBLY FOR A PORT OF AN ENCLOSURE THAT PERMITS A CABLE TERMINATED WITH A CONNECTOR TO BE INSERTED INTO AND REMOVED FROM THE PORT WITH THE CONNECTOR ATTACHED TO THE CABLE

CROSS-REFERENCE TO RELATED APPLICATION

This application claims the benefit of U.S. Provisional Application No. 63/412,511 filed Oct. 2, 2022, the disclosure of which is hereby incorporated by reference herein in its entirety.

BACKGROUND

Conventional sealing ports of cable enclosure boxes typically have a round opening through which a non-terminated cable end can be inserted and sealed via an interference fit between the seal and the cable. Then, after the cable end is inserted into the box, the cable end is terminated with a connector that is larger than the opening through the seal. Thus, in order to remove the cable from the box, the connector has to be removed usually by cutting the cable. The cable must then be terminated with a new connector after being reinserted into the enclosure box. All of this wastes the technician user's time and the cost of multiple connectors.

Accordingly, it may be desirable to provide a seal assembly for a port of an enclosure that permits a cable terminated with a connector to be inserted into and removed from the port of the enclosure with a connector attached to the cable.

SUMMARY

In an embodiment according to the disclosure, a seal assembly for a port of an enclosure may include a first body portion that may include a sealing member, a first body portion structurally configured to include a receiving portion that may be structurally configured to receive the sealing member, and a second body portion structurally configured to be coupled with the first body portion and to include an engagement portion. The sealing member may comprise a resilient member, and the sealing member may include a receiving portion that is structurally configured to receive a portion of a cable. The first and second body portions may be structurally configured to define a port of an enclosure that is configured to receive at least the portion of the cable when the first and second body structure segments are disposed in a closed position relative to one another. The port may be structurally configured to include a cross-sectional dimension that is smaller than a cross-sectional dimension of a connector that terminates the cable when the first and second body portions are in the closed position relative to one another. The engagement portion may be structurally configured to urge a closing portion of the sealing member onto the portion of a cable terminated with a connector in the receiving portion of the sealing member to form a liquid-tight seal between the second portion of the cable and the sealing member when the first and second body portions are disposed in the closed position. The first and second body portions may be structurally configured to move relative to one another between an open position and the closed position such that the seal arrangement is structurally configured to permit a cable terminated with a connector to be inserted into and/or removed from the sealing member and the port with the connector attached to the cable when the first and second body structure segments are in the open position.

In an embodiment according to the disclosure, a seal assembly for a port of an enclosure may include a first body portion that may include a sealing member, a first body portion structurally configured to include a receiving portion that is structurally configured to receive the sealing member, and a second body portion structurally configured to be coupled with the first body portion and to include an engagement portion The first and second body portion may be configured to define a port that is structurally configured to have a cross-sectional dimension that is smaller than a cross-sectional dimension of a connector of a terminated cable when the first and second body portions are in a closed position relative to one another. The sealing member may include a receiving portion that is structurally configured to receive the terminated cable. The engagement portion is structurally configured to urge a closing portion of the sealing member against the terminated cable to form a liquid-tight seal around the terminated cable when the first portion and the second portion are in the closed position. The first and second body portions are structurally configured to move relative to one another between an open position and the closed position such that the seal arrangement is structurally configured to permit a cable terminated with a connector to be inserted into and/or removed from the sealing member and the port with the connector attached to the cable when the first and second body structure segments are in the open position.

In an embodiment according to the disclosure, a seal assembly for a port of an enclosure may include a first body portion that may include a sealing member, and a second body portion structurally configured to include an engagement portion. The sealing member may include a receiving portion that is structurally configured to receive a terminated cable, and the engagement portion may be structurally configured to urge a closing portion of the sealing member against the terminated cable to form a liquid-tight seal around the terminated cable when the first portion and the second portion are coupled together in a closed position. The first and second body portions may be structurally configured to move relative to one another between an open position and the closed position such that the seal arrangement is structurally configured to permit a cable terminated with a connector to be inserted into and/or removed from the sealing member and the port with the connector attached to the cable when the first and second body portions are in the open position.

Various aspects of the seal assembly, as well as other embodiments, objects, features and advantages of this disclosure, will be apparent from the following detailed description of illustrative embodiments thereof, which is to be read in conjunction with the accompanying drawings.

BRIEF DESCRIPTION OF THE DRAWINGS

FIG. 1D is a detailed perspective view of the interference fit structure of the seal assembly of FIG. 1A arranged in accordance with various aspects of the disclosure.

FIG. 2A is a perspective view of a portion of an exemplary enclosure box that comprises a seal assembly having two sealing member receiving areas with corresponding interference fit structures in an open position in accordance with various aspects of the disclosure.

DETAILED DESCRIPTION OF EMBODIMENTS

Figures 1A, 1B, 1C:
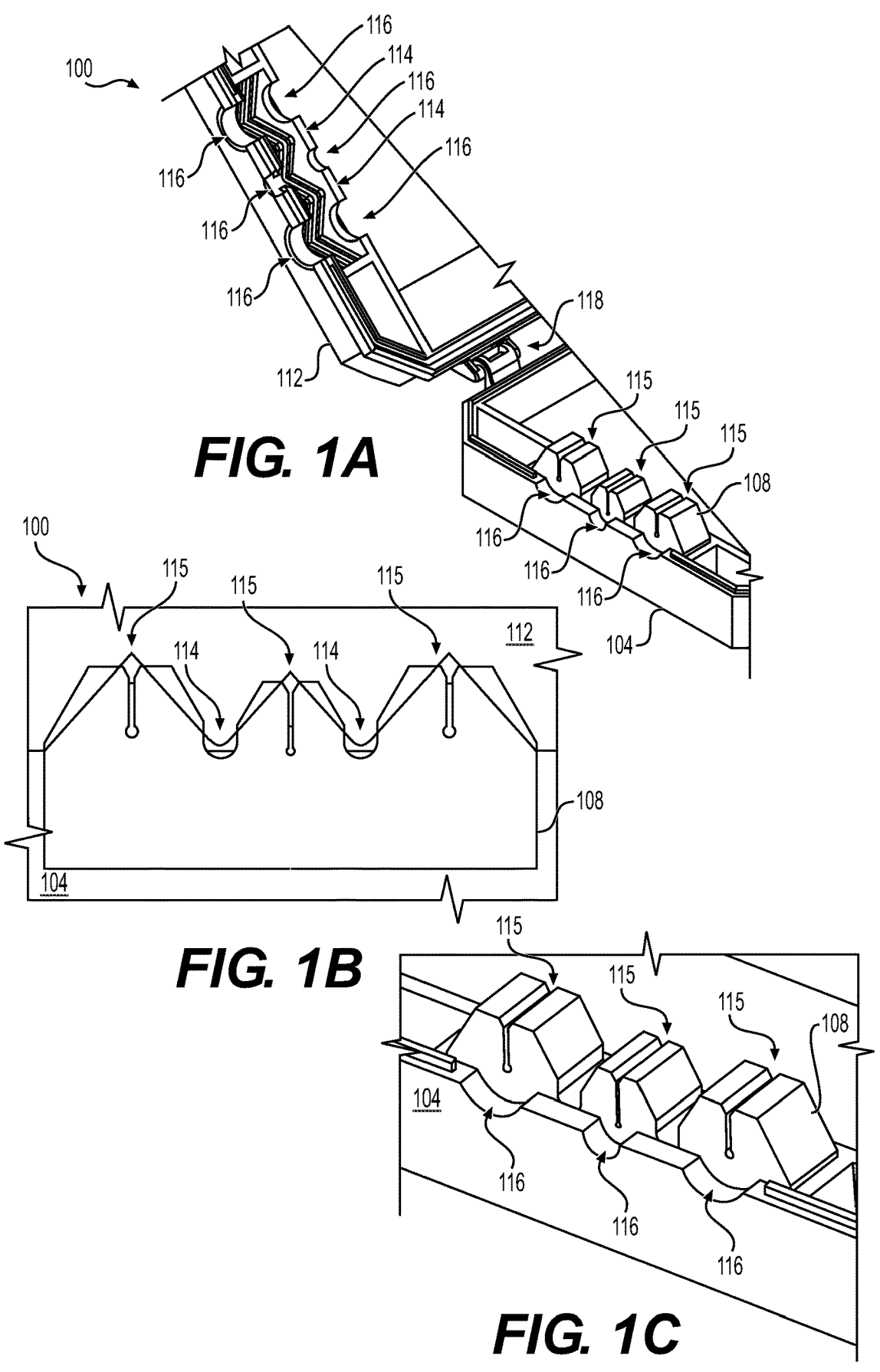
FIG. 1A is a perspective view of a portion of an exemplary enclosure box that comprises a seal assembly having a sealing member receiving area with a corresponding interference fit structure in an open position in accordance with various aspects of the disclosure.
FIG. 1B is a detailed side view of a body structure segment that comprises the sealing member of the seal assembly of FIG. 1A in accordance with some aspects of the disclosure.
FIG. 1C is a detailed perspective view of the sealing member of the seal assembly of FIG. 1A configured in accordance with various embodiments of the disclosure.

The description provided herein is better understood when read in conjunction with the accompanying drawings which are included by way of example and not by way of limitation. It will be understood that like reference numerals identify like components throughout the drawings, unless the context indicates otherwise. It will also be understood that some or all of the figures may be schematic representations for purposes of illustration and do not necessarily depict the actual relative sizes or locations of the elements shown.

In some embodiments, the present disclosure provides a molded plastic clamp feature that encompasses two halves, one with a separate foam or rubber part, and the other having built in plastic ramps that provide compression to the separate foam or rubber part. The foam or rubber part(s) are structured to house cables, which are held in one half of the clamp and have an opening (e.g., a slot or the like) in the material to accept the cables, and the other half which is pressed down (to close the box or assembly it is being used in) and forces the soft part inwards towards the cable to prevent water penetration. In some embodiments, the ramped hard plastic part includes at least two angled parts that meet at a point to create a triangle or V-shaped structure, or a half circle part to perform the same function. The form or rubber part or sealing member houses cables and gets clamped when the assembly is in a closed position. The seal assembly of the present disclosure eliminate the need to cut or otherwise separate connectors from cables (e.g., coaxial cables, fiber optic cables, ethernet cables, etc.) in order to remove the connectors from enclosure boxes, since the boxes can be re-entered or repeatedly opened and closed.

To illustrate, FIGS. 1A-1D show a portion of an enclosure box 100 or components thereof from various views according to an exemplary embodiment. As shown, the enclosure box 100 includes a first portion 104, for example, a first body structure segment, that comprises a first sealing member receiving portion 106 and a first sealing member or first sealing portion 108 disposed in the first sealing member receiving portion 106. The first sealing portion 108 may include a receiving portion 109, for example, a slot, slit, or the like, that is open at a first end of the first sealing portion 108. The first sealing member 108 comprises a first resilient material, such as a polymer, rubber, or combination thereof, and a first opening 110, as shown in FIG. 1C, that is structured to receive a first portion, for example, a jacketed portion, of a cable, such as a coaxial cable, a fiber optic cable, an ethernet cable, or the like. In some embodiments, the cable is terminated with a connector, such as an adapter, interface, cassette, plug, or receptacle, which has a larger cross-section than a cross-section of the cable in a direction transverse to a length of the cable. In some embodiments, portions of the first sealing member 108 include a resilient material, such as a foam, an elastomer, and/or the like.

Enclosure box 100 also includes a second portion 112, for example, a second body structure segment, that comprises an engagement portion 114 that is structurally configured to rotate about a hinge 118 and to press a first portion of a cable into the first opening 110 of the first sealing member 108 to form a first substantially liquid-proof seal via an interference fit between the first portion of the cable and the first sealing member when the first opening 110 of the first sealing member 108 receives the first portion of the cable and the first and second portions 104, 112 are disposed in a closed position relative to one another.

As illustrated in FIG. 1B, the engagement portion 114 of the second portion 112, when closed onto the first portion 104, urges a closing portion 128 of the first sealing member 108 onto a cable received in the receiving portion 109, for example, a slit, of the first sealing member 108. In some aspects, the closing portion 128 may include an angular outside portion of the first sealing member 108 that, when in the closed position, forces the respective cable slit 115 that houses and secures the cable into a sealing configuration. As illustrated, the first sealing member 108 may include one or more slits 115 that respond to cable installation therein by expanding laterally and are subsequently forced into the sealing configuration of FIG. 1B via physical engagement of the engagement portion 114 of the second body portion 112 when the second body portion 112 is moved, via the hinge 118, into a closed position relative to the first sealing member 108 and first body portion 104.

FIG. 1C illustrates a perspective view of portions of the box 100 with the second body portion 112 separated from the first sealing member 108 and first body portion 104.

Figures 1D, 2A:
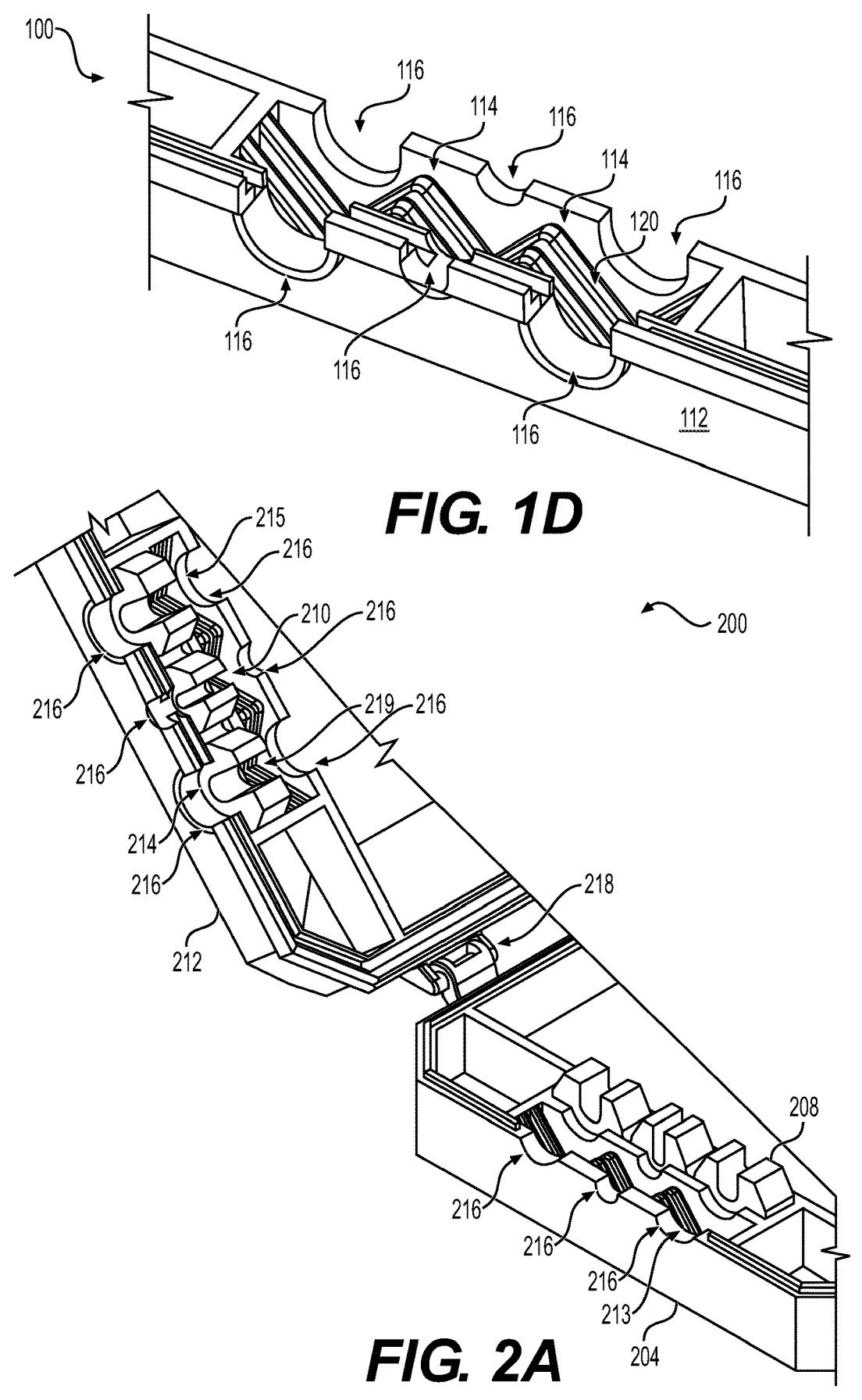

Each slit 115 of the first sealing member 108 may include a corresponding curvilinear port 116 that is aligned to accommodate the shape and size of a cable. It is noted that the size and shape of the respective ports 116 can be arranged to indicate to a user the intended, proper size of cable that can be sealed by the first sealing member 108, and the size and shape of the respective ports 116 may vary. FIG. 1D provides a more detailed illustration of how the engagement portion 114 may comprise V-shaped or ramped structures 120, but neither arrangement is required or limiting, as other engagement arrangements can be employed alone, or in combination with the V-shaped or ramped structures 120 conveyed in FIGS. 1A and 1D. The configuration of the second engagement portion 114 can, in some embodiments, match portions of the configuration of the first sealing member 108 to provide consistent, sealing force onto the cable slits 115 when the body portions 104, 112 are closed together, as shown in FIG. 1B.

As also shown, the first and second body portions 104, 112 are operably connected to each other via a centrally located hinge mechanism 118. The first and second body portions 104, 112 together define a port 116, as more clearly shown in FIG. 1C, that is configured to receive at least the first portion of the cable when the first and second portions 104, 112 are disposed in the closed position relative to one another. Although not shown, the cable is terminated with a connector that is larger than a cross-sectional dimension of the port 116 when the first and second body portions 104, 112 are disposed in the closed position relative to one another.

In addition, the first and second body portions 104, 112 are configured to reversibly move relative to one another between an open position and the closed position, such that the cable can remain attached to the connector when the first portion of the cable is positioned in or removed from the first opening 110 of the first sealing member 108 while the first and second body portions 104, 112 are in the open position. As shown, the enclosure box 100 may be structured to house multiple cables at the same time, yet, housing a single cable will not degrade the liquid-proof characteristic of the box 100 due, at least, to the configuration of the first sealing member 108.

To further illustrate various embodiments of the disclosure, FIGS. 2A-2D respectively show portions of an enclosure box 200, along with components thereof, from various views, according to another exemplary embodiment. As shown, the enclosure box 200 includes a first body portion 204 that comprises a first receiving portion 206 structurally configured to receive a first sealing portion or sealing member 208. The first sealing member 208 comprises a first resilient material and a first opening 210 that is structurally configured to receive a first portion of the cable 211. Enclosure box 200 also includes a second body portion 212 that comprises a second engagement portion 219 that is configured to urge a closing portion 228 of the sealing member 208 onto the first portion of the cable 211 that is received in the first opening 210 of the first sealing member 208 to form a first substantially liquid-proof seal via, for example, an interference fit between the first portion of the cable 211 and the first sealing member 208 when the first and second body portions 204, 212 are disposed in a closed position relative to one another.

As additionally shown, the first body portion 204 may further include a first engagement portion 213 and the second body portion 212 may include a second receiving portion 214 configured to receive a second sealing member 215. The second sealing member 215 comprises a second resilient material and a second opening 217 that is structurally configured to receive a second portion of the cable 211. The first engagement portion 213 is configured to urge a closing portion 225 of the second sealing member 215 onto the second portion of the cable 211 that is received in the second opening 217 of the second sealing member 215 to form a second substantially liquid-proof seal, for example, via an interference fit between the second portion of the cable 211 and the second sealing member 215 when the first and second body portions 204, 212 are disposed in a closed position relative to one another.

The first and second body portions 204, 212 are structurally configured to together define a port 216 that is configured to receive at least the first portion of the cable 211 when the first and second body portions 204, 212 are disposed in the closed position relative to one another. Although not shown, the connector is larger than a cross-sectional dimension of the port 216 when the first and second body portions 204, 212 are disposed in the closed position relative to one another. In addition, the first and second body portions 204, 212 are configured to reversibly move relative to one another between an open position and the closed position such that the cable remains attached to the connector when the first portion of the cable is positioned in or removed from the first opening 210 of the first sealing member 208 and the second opening 217 of the second sealing member 215 while the first and second body portions 204, 212 are in the open position. The first and second body portions 204, 212 are operably connected to each other via a hinge mechanism 218. As shown, enclosure box 200 may be structured to house multiple cables at the same time.

Figures 2B, 2C, 2D:
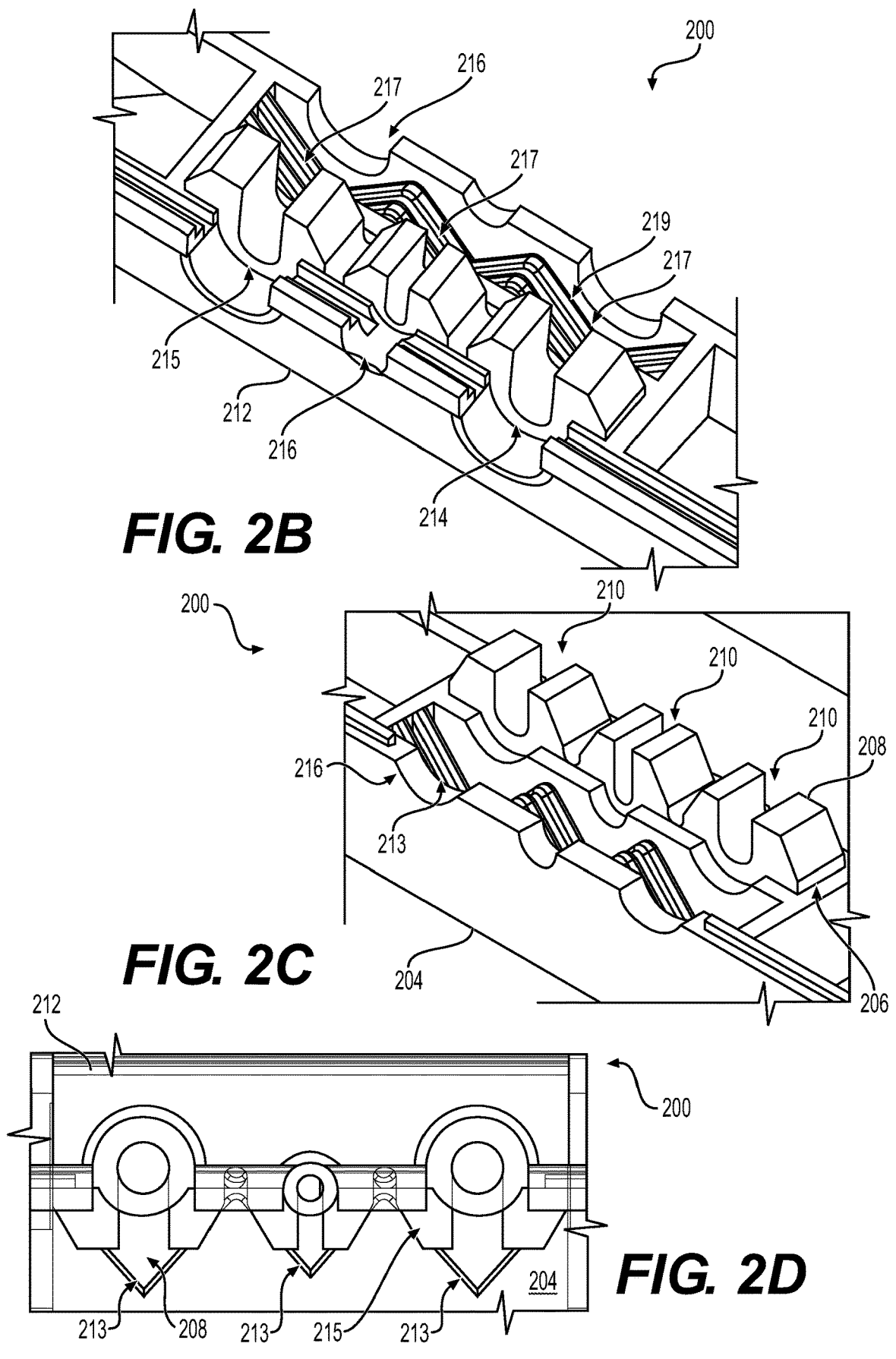
FIG. 2B is a detailed perspective view of the first body structure segment of the seal assembly of FIG. 2A configured in accordance with various aspects of the disclosure.
FIG. 2C is a detailed perspective view of the second body structure segment of the seal assembly of FIG. 2A arranged in accordance with various embodiments of the disclosure.
FIG. 2D is a detailed side view of the seal assembly of FIG. 2A in a closed position in accordance with various aspects of the disclosure.

Specifically, FIG. 2A illustrates how the respective sealing members 208, 215 are nested within the respective sealing member receiving areas 206, 214 that collectively operate to provide a stacked sealing configuration shown in FIG. 2D when the body structure segments 204, 212 are closed. The combination of opposite facing sealing members 208, 215 along with opposite facing interference fit structures 213, 219, as respectively shown in FIGS. 2B and 2C, promote reliable, liquid-proof sealing of one or more terminated cables in response to forces and/or environmental stresses in multiple different directions relative to the box 200.

Figures 3A, 3B, 3C, 3D, 3E:
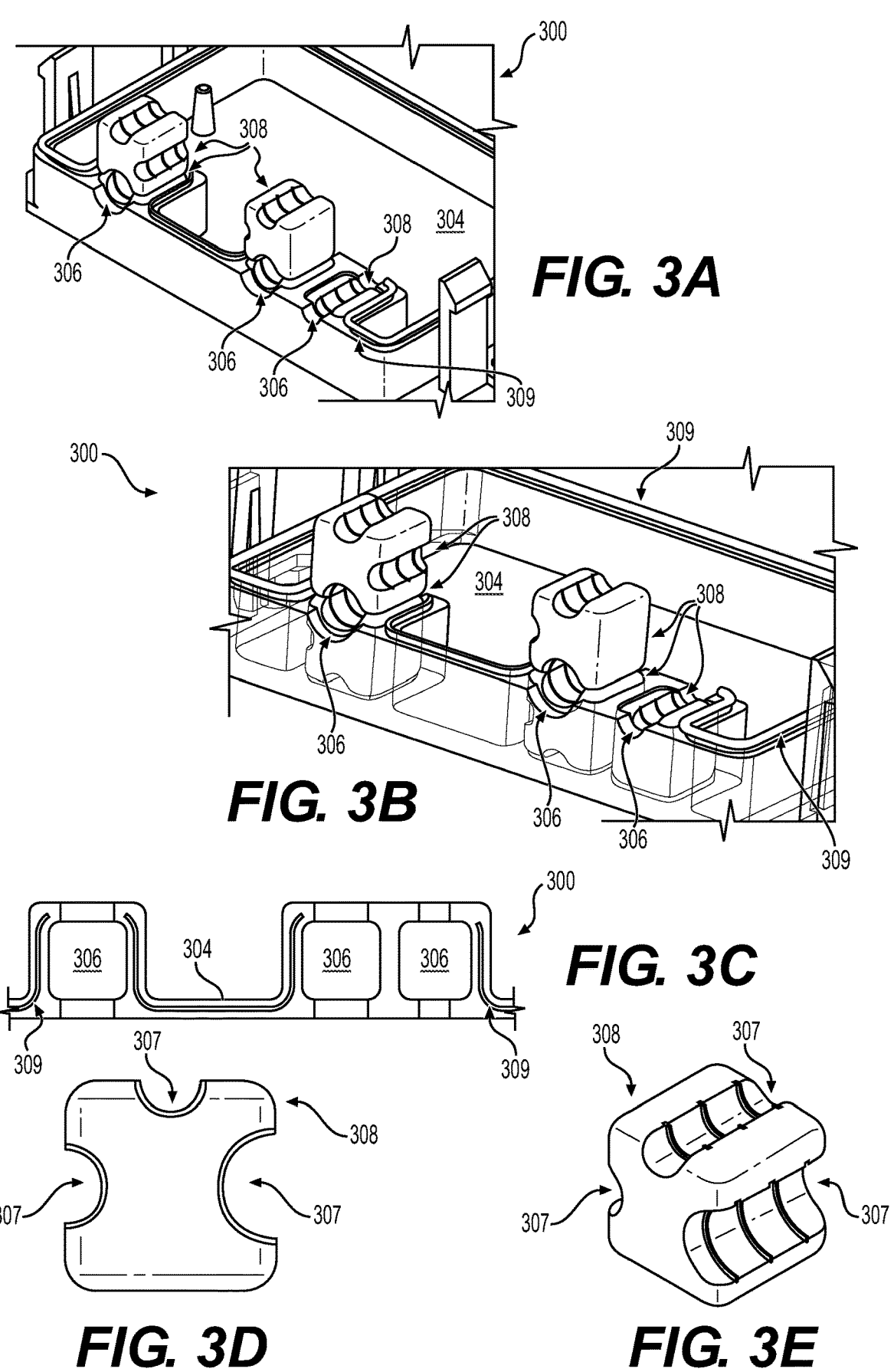
FIG. 3A is a perspective view of a portion of an exemplary enclosure box that comprises a seal assembly having a sealing member receiving area that comprises sealing members that include two or more openings that are structured to selectively receive portions of cables that comprise different diameters in an open position in accordance with various aspects of the disclosure.
FIG. 3B is a partially transparent perspective view of the portion of the exemplary box of FIG. 3A configured in accordance with various embodiments of the disclosure.
FIG. 3C is a top view of a sealing member receiving area of the portion or the exemplary box of FIG. 3A arranged in accordance with various aspects of the disclosure.
FIG. 3D is a side view of a sealing member of the portion of the exemplary box of FIG. 3A configured in accordance with various embodiments of the disclosure.
FIG. 3E is a perspective view of a sealing member of the portion of the exemplary box of FIG. 3A arranged in accordance with various embodiments of the disclosure.

As yet another illustration of assorted aspects of a liquid-proof seal for terminated cables, FIGS. 3A-3E respectively show portions of an enclosure box, along with components thereof, from various views according to an exemplary embodiment. As shown in FIG. 3A, the enclosure box 300 includes a first body structure segment 304 that comprises a first sealing member receiving area 306 and first sealing members 308 disposed in the first sealing member receiving area 306. Although not shown, the enclosure box 300 also includes a separate second body structure segment that also includes a sealing member receiving area that essentially mirrors sealing member receiving area 306 and is configured to receive portions of first sealing members 308. The first sealing member 308 comprises a first resilient material and a two or more openings 307 that are structured to selectively receive portions of cables that comprise different diameters (e.g., three different sized cables: (1) Cat 6, (2) Cat 6A, and (3) Cat 6A with messenger cable in some embodiments). More specifically, two sealing members combine to surround a given cable. In the embodiment shown, each sealing member has three sides with semi-circular cutouts of different sizes so that each sealing member can be arranged to accommodate different sized cables. Essentially any resilient material is optionally used in the sealing members of the present disclosure. In some embodiments, the resilient material is a foam, an elastomer, and/or the like.

As additionally shown, enclosure box 300 comprises a cavity 308 that is configured to receive at least the connector (not shown) when the first and second body structure segments are disposed in the closed position relative to one another. A cable remains attached to the connector when the connector is positioned in or removed from the cavity 308 while the first and second body structure segments are in the open position. As shown, enclosure box 300 is structured to house multiple cables at the same time.

The perspective views of the box 300 in FIGS. 3A and 3B illustrate how sealing members 308 fit in sealing member receiving areas 306 that are further surrounded, partially, by a box gasket 309. The top view of portions of the box 300 in FIG. 3C convey how the box gasket 309 can extend to supplement the respective sealing members 308 that are each configured to fit within a sealing member receiving area 306. Various embodiments of the sealing member 308, as conveyed in more detail in FIGS. 3D and 3E, provide modularity by having different sized openings 307 that can accommodate differently sized cables. In practice, a user can simply rotate a sealing member 308 to accommodate and reliably seal differently sized cables and attached cable termination fittings.

Figures 4A, 4B, 4C:
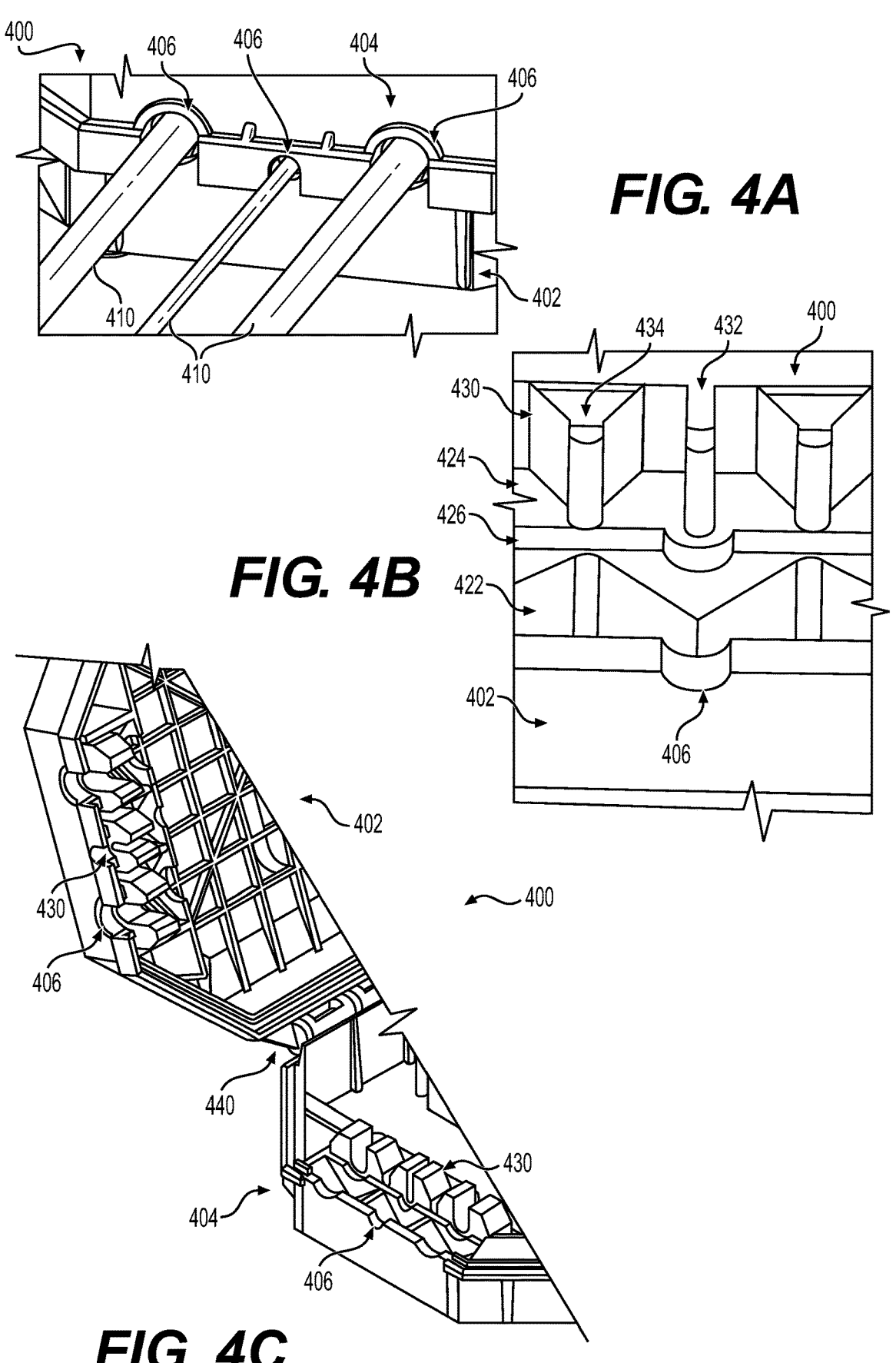
FIG. 4A is a perspective view of portions of an exemplary enclosure box configured in accordance with various embodiments to seal multiple different cables.
FIG. 4B is a perspective view of portions of the enclosure box of FIG. 4A arranged in accordance with various embodiments of the disclosure.
FIG. 4C is a perspective view of portions of the enclosure box of FIG. 4A operated in accordance with various embodiments of the disclosure.

FIGS. 4A-4C respectively depict portions of an enclosure box 400 arranged in accordance with various embodiments to concurrently seal multiple, differently sized, cables that are each terminated. In FIG. 4A, the enclosure box 400 has a bottom portion 402 that attaches and secures to a top portion 404 to provide a liquid-tight seal for the assorted cables 410. It is noted that the cables 410 can be any size, type, and capability that are respectively terminated within the internal cavity defined by the bottom portion 402 and the top portion 404. For instance, a fiber optic cable 410, coaxial cable 410, and ethernet cable 410, that each have different cross-sectional diameters, may concurrently enter the enclosure box 400 and terminate with different, or matching, connectors, adapters, or interfaces.

The respective cables 410 enter the enclosure box 400 via separate ports 406 that are sized to provide efficient installation access without jeopardizing the liquid sealing integrity of the box 400. Although a port 406 may not have a sealing member to provide protection from liquid penetration of the enclosure box 400, various embodiments position at least one sealing portion in contact with the respective cables 410 proximal the ports 406 to ensure a liquid-tight seal of the cable 410 entry areas.

FIGS. 4B and 4C respectively illustrate portions of a sealing configuration of the enclosure box 400 arranged in accordance with various embodiments to provide a liquid-tight interface concurrently for the multiple cables 410. The detailed aspects of the bottom portion 402 shown in FIG. 4B convey how the sealing configuration separates an interference portion 422 and seal portion 424 with a rigid wall 426 while providing a continuous port 406 aperture that can be occupied by a single cable 410. The interference portion 422 comprises dynamic, rigid surfaces that are shaped to interact with a sealing member 430 to apply consistent closing force when the bottom box portion 402 is secured to the top box portion 404, as shown in FIG. 4A.

Although not required or limiting, the sealing member 430 has a cable slot 432 disposed between sidewalls that are each beveled outward to receive surfaces of an interface portion 422. The sealing member 430 may secure a single cable 410, but some embodiments seal multiple cables 410, and ports 406, with a single sealing member 430 that has a separation grooves 434 positioned on lateral sides of the sidewalls defining the cable slot 432 to allow efficient and reliable movement of the sidewalls to close around a cable 410 occupying the cable slot 432. That is, a single sealing member 430 may provide multiple cable slots 432 that can individually close around separate cables 410 in response to physical engagement with an interference portion 422 due to the material construction of the sealing member 430 and the construction of the separation grooves 434.

FIG. 4C conveys how the top box portion 404 and bottom box portion 402 are respectively configured with matching, although inverted, sealing configurations that mate to form the liquid-tight seal of separate cables 410 shown in FIG. 4A. By arranging each cable port 406 with two sealing members 430 that are respectively forced to close upon a cable 410 by the surfaces of the interface portion 422 of the opposite box portion 402/404, a liquid-tight box interface can be established and maintained.

The position and shape of the sealing members 430 on opposite sides of the enclosure box 400 allow a terminated cable to be efficiently installed into the respective cable slots 432 without removing the terminal end, such as a connector or adapter. In other words, a cable 410 can be terminated outside of the enclosure box 400 and subsequently installed into a cable slot 432 of a sealing member 430 while the box portions 402/404 are separated. Closure of the box portions 402/404 further brings an additional sealing member 430 into contact with a cable 410 occupying a cable slot 432 and forces the resilient material of each sealing member 430 towards the installed cable 410 due to the angled orientation of the interface portion 422 surfaces and their respective engagement with the sealing member 430 aspects proximal each cable slot 432.

While the sealing configuration illustrated in FIGS. 4A-4C convey matching sealing members 430 and matching interface portions 422, such arrangement is not required. For instance, the sealing members 430 can be interchanged by a technician to provide different cable slot 432 shapes and/or sizes along with different physical engagement with interface portions 422. It is contemplated that different sealing members 430 can be employed in an enclosure box 400 to accommodate different cable 410 configurations, such as non-circular ribbon cables or cables with dynamic outer jacket diameters. Other embodiments of a sealing configuration concurrently provide different interface portion 422 surface configurations to provide dynamic cable slot 432 closure force through engagement with a sealing member 430 of the opposite box portion 402/404.

As shown in FIG. 4C, the box portions 402/404 are connected via a hinge 440, which ensures alignment of the respective interface portions 422 with the corresponding sealing members 430. However, such a hinged connection is not required and the respective box portions 402/404 may pivot around each other in other ways or be separated completely. A non-limiting embodiment provides one or more alignment features, such as posts, tabs, or grooves that cooperate with at least one fastening mechanism, such as a spring tab, screw, strap, or keyed engagement, to consistently and reliably force the respective interface portions 422 onto the respective sealing members 430 to move aspects of the sealing member 430 toward a cable 410 occupying a cable slot 432 to close and seal the cable slot 432.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the inven- tion is set forth in the following claims.

What is claimed is:

1. A seal assembly for a port of an enclosure that permits a cable terminated with a connector to be inserted into and/or removed from the port of the enclosure with the connector attached to the cable, comprising:

a sealing member;

a first body portion structurally configured to include a receiving portion that is structurally configured to receive the sealing member;

a second body portion structurally configured to be coupled with the first body portion and to include an engagement portion;

wherein the sealing member comprises a resilient member;

wherein the sealing member includes a receiving portion that is structurally configured to receive a portion of a cable;

wherein the first and second body portions are structurally configured to define a port of an enclosure that is configured to receive at least the portion of the cable when the first and second body structure segments are disposed in a closed position relative to one another;

wherein the port is structurally configured to include a cross-sectional dimension that is smaller than a cross-sectional dimension of a connector that terminates the cable when the first and second body portions are in the closed position relative to one another;

wherein the engagement portion is structurally configured to urge a closing portion of the sealing member onto the portion of a cable terminated with a connector in the receiving portion of the sealing member to form a liquid-tight seal between the second portion of the cable and the sealing member when the first and second body portions are disposed in the closed position; and wherein the first and second body portions are structurally configured to move relative to one another between an open position and the closed position such that the seal arrangement is structurally configured to permit a cable terminated with a connector to be inserted into and/or removed from the sealing member and the port with the connector attached to the cable when the first and second body portions are in the open position.

2. The seal assembly of claim 1, wherein the receiving portion of the sealing member comprises a slit that is configured to receive the terminated cable, and the closing portion comprises closing portions separated by the slit.

3. The seal assembly of claim 2, wherein the engagement portion of the second body portion includes angled surfaces that are structurally configured to engage the closing portions of the sealing member and urge the closing portions into engagement with the terminated cable to form the liquid-tight seal.

4. The seal assembly of claim 1, further comprising a second sealing member, wherein:

the second body portion is structurally configured to include a receiving portion that is structurally configured to receive the second sealing member;

the first body portion is structurally configured to include an engagement portion; and wherein the engagement portion of the first body portion is structurally configured to urge a closing portion of the second sealing member onto a second portion of the cable terminated with a connector in a receiving portion of the second sealing member to form a liquid-tight seal between the second portion of the cable and the second sealing member when the first and second body portions are disposed in the closed position.

5. The seal assembly of claim 1, wherein the sealing member includes a plurality of sealing portions; and wherein each sealing member includes a receiving portion configured to receive a terminated cable.

6. The seal assembly of claim 5, wherein the engagement portion is structurally configured to urge closing portions of each sealing member onto a cable terminated with a connector in the receiving portion of each sealing member to form a liquid-tight seal between the second portion of the cable and the sealing member when the first and second body portions are disposed in the closed position.

7. A seal assembly for a port of an enclosure that permits a cable terminated with a connector to be inserted into and/or removed from the port of the enclosure with the connector attached to the cable, comprising:

a sealing member;

a first body portion structurally configured to include a receiving portion that is structurally configured to receive the sealing member;

a second body portion structurally configured to be coupled with the first body portion and to include an engagement portion;

wherein the first and second body portion are configured to define a port that is structurally configured to have a cross-sectional dimension that is smaller than a cross-sectional dimension of a connector of a terminated cable when the first and second body portions are in a closed position relative to one another;

wherein the sealing member includes a receiving portion that is structurally configured to receive the terminated cable;

wherein the engagement portion is structurally configured to urge a closing portion of the sealing member against the terminated cable to form a liquid-tight seal around the terminated cable when the first portion and the second portion are in the closed position; and wherein the first and second body portions are structurally configured to move relative to one another between an open position and the closed position such that the seal arrangement is structurally configured to permit a cable terminated with a connector to be inserted into and/or removed from the sealing member and the port with the connector attached to the cable when the first and second body portions are in the open position.

8. The seal assembly of claim 7, wherein the receiving portion of the sealing member comprises a slit that is configured to receive the terminated cable, and the closing portion comprises closing portions separated by the slit.

9. The seal assembly of claim 8, wherein the engagement portion of the second body portion includes angled surfaces that are structurally configured to engage the closing portions of the sealing member and urge the closing portions into engagement with the terminated cable to form the liquid-tight seal.

10. The seal assembly of claim 7, further comprising a second sealing member, wherein:

the second body portion is structurally configured to include a receiving portion that is structurally configured to receive the second sealing member;

the first body portion is structurally configured to include an engagement portion; and wherein the engagement portion of the first body portion is structurally configured to urge a closing portion of the second sealing member onto a second portion of the cable terminated with a connector in a receiving portion of the second sealing member to form a liquid-tight seal between the second portion of the cable and the second sealing member when the first and second body portions are disposed in the closed position.

11. The seal assembly of claim 7, wherein the sealing member includes a plurality of sealing portions; and wherein each sealing member includes a receiving portion configured to receive a terminated cable.

12. The seal assembly of claim 11, wherein the engagement portion is structurally configured to urge closing portions of each sealing member onto a cable terminated with a connector in the receiving portion of each sealing member to form a liquid-tight seal between the second portion of the cable and the sealing member when the first and second body portions are disposed in the closed position.

13. The seal assembly of claim 7, wherein the port is structurally configured to include a cross-sectional dimension that is smaller than a cross-sectional dimension of a connector that terminates the cable when the first and second body portions are in the closed position relative to one another.

14. A seal assembly for a port of an enclosure that permits a cable terminated with a connector to be inserted into and/or removed from the port of the enclosure with the connector attached to the cable, comprising:

a first body portion that includes a sealing member;

a second body portion structurally configured to include an engagement portion;

wherein the sealing member includes a receiving portion that is structurally configured to receive a terminated cable;

wherein the engagement portion is structurally configured to urge a closing portion of the sealing member against the terminated cable to form a liquid-tight seal around the terminated cable when the first portion and the second portion are coupled together in a closed position; and wherein the first and second body portions are structurally configured to move relative to one another between an open position and the closed position such that the seal arrangement is structurally configured to permit a cable terminated with a connector to be inserted into and/or removed from the sealing member and the port with the connector attached to the cable when the first and second body portions are in the open position.

15. The seal assembly of claim 14, wherein the receiving portion of the sealing member comprises a slit that is configured to receive the terminated cable, and the closing portion comprises closing portions separated by the slit.

16. The seal assembly of claim 15, wherein the engagement portion of the second body portion includes angled surfaces that are structurally configured to engage the closing portions of the sealing member and urge the closing portions into engagement with the terminated cable to form the liquid-tight seal.

17. The seal assembly of claim 16, further comprising a second sealing member, wherein:

the second body portion is structurally configured to include a receiving portion that is structurally configured to receive the second sealing member;

the first body portion is structurally configured to include an engagement portion; and wherein the engagement portion of the first body portion is structurally configured to urge a closing portion of the second sealing member onto a second portion of the cable terminated with a connector in a receiving portion of the second sealing member to form a liquid-tight seal between the second portion of the cable and the second sealing member when the first and second body portions are disposed in the closed position.

18. The seal assembly of claim 14, wherein the sealing member includes a plurality of sealing portions; and wherein each sealing member includes a receiving portion configured to receive a terminated cable.

19. The seal assembly of claim 18, wherein the engagement portion is structurally configured to urge closing portions of each sealing member onto a cable terminated with a connector in the receiving portion of each sealing member to form a liquid-tight seal between the second portion of the cable and the sealing member when the first and second body portions are disposed in the closed position.

20. The seal assembly of claim 14, wherein the port is structurally configured to include a cross-sectional dimension that is smaller than a cross-sectional dimension of a connector that terminates the cable when the first and second body portions are in the closed position relative to one another.

* * * * *